United States Patent
Lu et al.

(10) Patent No.: US 7,961,760 B2
(45) Date of Patent: Jun. 14, 2011

(54) METHOD AND SYSTEM FOR NETWORK SYNCHRONIZATION

(75) Inventors: Hsueh-Han Lu, Taipei County (TW); Hung-Ren Lai, Hualien County (TW)

(73) Assignee: Institute for Information Industry, Taipei (TW)

( * ) Notice: Subject to any disclaimer, the term of this patent is extended or adjusted under 35 U.S.C. 154(b) by 211 days.

(21) Appl. No.: 12/335,541

(22) Filed: Dec. 16, 2008

(65) Prior Publication Data

US 2010/0124240 A1 May 20, 2010

(30) Foreign Application Priority Data

Nov. 19, 2008 (TW) .............................. 97144753 A (51) Int. Cl.
*H04J 3/06* (2006.01)
(52) U.S. Cl. ..................... 370/503; 375/140
(58) Field of Classification Search .................. 370/311, 370/315, 321, 329, 503; 455/450; 375/140
See application file for complete search history.

(56) References Cited

U.S. PATENT DOCUMENTS

| 2006/0104241 A1* | 5/2006 | Kim | 370/329 |
| 2006/0187866 A1* | 8/2006 | Werb et al. | 370/311 |
| 2007/0177574 A1* | 8/2007 | Park et al. | 370/350 |
| 2008/0291855 A1* | 11/2008 | Bata et al. | 370/311 |

* cited by examiner

*Primary Examiner* — Ricky Ngo
*Assistant Examiner* — David Oveissi
(74) *Attorney, Agent, or Firm* — Jianq Chyun IP Office (57) ABSTRACT

A method and a system for network synchronization are provided. In this method, when a node attempts to join a network, a parent node is searched from all other nodes already joined the network per specific time interval. If the parent node can be found, sync-information sent by the parent node is received by the node so as to synchronize with the parent node and enter a working mode. When a sleeping instruction sent by the parent node is received, or a timer determines that a network ending time is reached according to the sync-information, the node switches to a sleeping mode. However, when the timer determines that a network wakeup time is reached according to the sync-information, the node attempts to join the network again. All nodes in the network can work and sleep simultaneously so as to extend the lifetime of the battery.

32 Claims, 5 Drawing Sheets

METHOD AND SYSTEM FOR NETWORK SYNCHRONIZATION

CROSS-REFERENCE TO RELATED APPLICATION

This application claims the priority benefit of Taiwan application serial no. 97144753, filed on Nov. 19, 2008. The entirety of the above-mentioned patent application is hereby incorporated by reference herein and made a part of this specification.

BACKGROUND OF THE INVENTION

1. Field of the Invention

The present invention generally relates to a network application, in particular, to a method and a system for network synchronization enabling all nodes in the network work and sleep at the same time.

2. Description of Related Art

Along with the progress of the wireless network technology, in many existing network architectures, information is transmitted in a wireless transmission manner. In a wireless sensor network (WSN), a sensor node obtains a sensing data, and a router node sends the data back to a coordinator node in the wireless transmission manner, such that a computer system connected to the coordinator node may obtain and apply the integrated data. The WSN becomes more and more popular because of the advantages such as convenient deploying and low maintaining cost. In addition, most of the sensor nodes have a sleeping capability to reduce the power consumption, such that the longer lifetime is one of the reasons why people increasingly attach importance to the WSN.

However, in the WSN architecture, only the sensor node may simply achieve the purpose of saving the power by sleeping. The reason is that the router node transmits data packets, so usually a permanent power source must be set to maintain the transmission smoothness of the wireless network. However, when the WSN is applied to an outdoor environment, the obtaining and the wiring of the permanent power source are not quite easy. Usually, soon after the wiring of the power source is finished, the line must be disassembled as the project is end. Therefore, it increasingly becomes a trend of using a battery to supply power for the whole WSN. However, under the situation of supplying power by using the battery instead of the permanent power source, it is a quite important topic how to ensure the transmission smoothness of the data and save the power consumption of the battery by using a sleeping mechanism.

Recently, for the method of making the nodes in the network work and sleep at the same time to save the power, the radio frequency (RF) hardware is added to serve as the tool of receiving sync-information or waking up the nodes. However, by using the manner, the hardware cost is increased, in addition, a signal coverage and the power consumption of the RF must be taken into consideration. Moreover, in order to make the nodes in the network work or sleep at different time, a complete lower layer support is required. Further, the lower layer of the network, for example, a physical layer or a media access control layer, must have a time-shared scheduling technique being time division multiple access (TDMA), so as to support the sending and the receiving of the data packet on the upper layer. However, usually it takes quite a long time to set the standard of the lower layer, and the software of all network lower layers must be developed matching with the standard, such that whole architecture of the network loses flexibility, and cannot be widely applied to various demands.

SUMMARY OF THE INVENTION

Accordingly, the present invention is directed to a method for network synchronization, capable of achieving a purpose of saving the total power consumption of a network by controlling nodes to work and sleep at the same time without using any additional hardware.

The present invention is also directed to a system for network synchronization, capable of attempting to join a network in different manners according to a state of a node, and synchronizing the node with an operating timing of the network.

As embodied and broadly described herein, the present invention provides a method for network synchronization, which is applicable for synchronizing a node with an operating time of a network. A most upstream of the network includes a coordinator node for defining sync-information. In this method, when a node attempts to join the network, a parent node is searched from other nodes already joined the network per time interval, and the time interval corresponds to a state of the node. If the parent node can be found, sync-information sent by the parent node is received so as to synchronize a timer in the node with the parent node, and the node enters a working mode. When a sleeping instruction sent by the parent node is received, or the timer determines that a network ending time is reached according to the sync-information, the node switches from the working mode to a sleeping mode. However, when the timer determines that a network wakeup time is reached according to the sync-information, the node executes the above steps to attempt to join the network again.

In an embodiment of the present invention, when the state of the node that the node attempts to join the network for a first time, the step of attempting to join the network further includes searching the parent node from other nodes already joined the network. If the parent node is not found, the node attempts to search the parent node again per first time interval.

In an embodiment of the present invention, when the state of the node is that the node ever joined the network, the step of attempting to join the network further includes searching the parent node from other nodes already joined the network. If the parent node is not found, it is determined whether a time of attempting to join the network by the node is smaller than a preset time or not. If the time is smaller than the preset time, the node attempts to search the parent node again per second time interval, and the second time interval is smaller than the first time interval.

In an embodiment of the present invention, after the step of determining whether the time of attempting to join the network by the node is smaller than the preset time or not, the method further includes determining whether a number of continuous failures of finding the parent node by the node is greater than a first preset number or not, if the time of attempting to join the network by the node is greater than or equal to the preset time. If the number is greater than the first preset number, the node searches the parent node per first time interval. However, if the number is smaller than or equal to the first preset number, the node enters the sleeping mode until the timer determines that the network wakeup time is reached, and attempts to search the parent node again per second time interval.

In an embodiment of the present invention, the preset time is a multiple of a network working period, the network working period is a maximum value of a time being in the working mode of all nodes already joined the network, and the network working period is greater than the first time interval.

In an embodiment of the present invention, the method further includes obtaining the preset network working period and a preset synchronization cycle by the coordinator node, and the network working period is smaller than the synchronization cycle. The coordinator node defines the network ending time and the network wakeup time of the next time, according to a current time thereof, the network working period, and the synchronization cycle.

In an embodiment of the present invention, the sync-information includes the current time, the network ending time, and the network wakeup time. When the parent node sends the sync-information to the node, the method further includes using a time of sending the sync-information as the current time.

In an embodiment of the present invention, the step of synchronizing the node with the parent node further includes updating the timer according to the current time in the sync-information.

In an embodiment of the present invention, when the node enters the working mode, the method further includes obtaining a data and sending the data to the parent node. When the node is a sensor node, the data is obtained through a sensor. When the node is a router node, the data sent by a child node is received, in which the so-called child node is the node selected the router node as the parent node when joining the network.

In an embodiment of the present invention, when receiving the sleeping instruction sent by the parent node, the node sends the sleeping instruction to the child node.

In an embodiment of the present invention, when determining that all data of the network is collected, the coordinator node sends the sleeping instruction to all nodes using the coordinator node as the parent node.

In an embodiment of the present invention, the method further includes sending the sleeping instruction to all nodes using the coordinator node as the parent node, when the coordinator node determines that a number of continuous failures of obtaining the data obtained by the node reaches a second preset number.

In an embodiment of the present invention, the network includes a wireless sensor network (WSN).

From another point of view, the present invention provides a system for network synchronization, which includes a network joining module, a time synchronization module, and a working/sleeping synchronization module. The network joining module is used to search a parent node from other nodes already joined the network per time interval, when a node attempts to join a network, in which the time interval corresponds to a state of the node. The time synchronization module is used to receive sync-information sent by the parent node, when the node finds the parent node, so as to synchronize a timer in the node with the parent node. The working/sleeping synchronization module is used to enable the node enter a working mode after the node finds the parent node, and enable the node switch from the working mode to a sleeping mode when receiving a sleeping instruction sent by the parent node or determining that a network ending time is reached according to the sync-information. When determining that a network wakeup time is reached according to the sync-information, the working/sleeping synchronization module controls the network joining module to attempt to join the network again.

In an embodiment of the present invention, when the state of the node is that the node attempts to join the network for the first time, the network joining module searches the parent node from other nodes already joined the network, and attempts to search the parent node again per first time interval when not finding the parent node.

In an embodiment of the present invention, when the state of the node is that the node ever joined the network, the network joining module searches the parent node from other nodes already joined the network, and determines whether a time of attempting to join the network by the node is smaller than a preset time or not, when not finding the parent node. If the time is smaller than the preset time, the network joining module attempts to search the parent node again per second time interval. The second time interval is smaller than the first time interval.

In an embodiment of the present invention, when the time of attempting to join the network by the node is greater than or equal to the preset time, the network joining module determines whether a number of continuous failures of finding the parent node by the node is greater than a first preset number or not. If the number is greater than the first preset number, the network joining module attempts to search the parent node again per first time interval. If the number is smaller than or equal to the first preset number, the working/sleeping synchronization module enables the node enter the sleeping mode until the network wakeup time is reached, and then controls the network joining module to attempt to search the parent node again per second time interval.

In an embodiment of the present invention, the preset time is a multiple of a network working period, in which the network working period is a maximum value of a time being in the working mode of all nodes already joined the network, and the network working period is greater than the first time interval.

In an embodiment of the present invention, when being a coordinator node, the time synchronization module obtains the preset network working period and a preset synchronization cycle, in which the network working period is smaller than the synchronization cycle, and defines the network ending time and the network wakeup time of the next time, according to a current time of the coordinator node, the network working period, and the synchronization cycle.

In an embodiment of the present invention, the sync-information includes the current time, the network ending time, and the network wakeup time. When the working/sleeping synchronization module sends the sync-information, a time of sending the sync-information is used as the current time. In addition, the time synchronization module updates the timer according to the current time in the sync-information.

In an embodiment of the present invention, after the node enters the working mode, the working/sleeping synchronization module obtains a data and sends the data to the parent node. When the node is a sensor node, the data is obtained through a sensor. When the node is a router node, the data sent by a child node is received, in which the node is selected as the parent node by the child node when the child node joins the network.

In an embodiment of the present invention, when receiving the sleeping instruction sent by the parent node, the working/sleeping synchronization module sends the sleeping instruction to the child node.

In an embodiment of the present invention, when belonging to a coordinator node, the working/sleeping synchronization module sends the sleeping instruction to all nodes using the coordinator node as the parent node, when determining that all data of the network is collected.

In an embodiment of the present invention, when determining that a number of continuous failures of obtaining the data obtained by the node reaches a second preset number, the working/sleeping synchronization module sends the sleeping instruction to all nodes using the coordinator node as the parent node.

In an embodiment of the present invention, the network includes a WSN.

In view of the above, in the present invention, when the node attempts to join the network, the node searches the parent node per specific time interval, and the node is synchronized with the parent node through sending the sync-information, such that the node knows the time of entering the sleeping mode and entering the working mode of the next time. As a result, all nodes joined the network may work and sleep at the same time according to the above manner, thereby reducing the total power consumption of the network. In the network architecture with the power supplied by a battery, the purpose of extending the lifetime of the battery is thus achieved.

In order to have a further understanding of above features and advantages of the present invention, a detailed description is given below with embodiments and accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
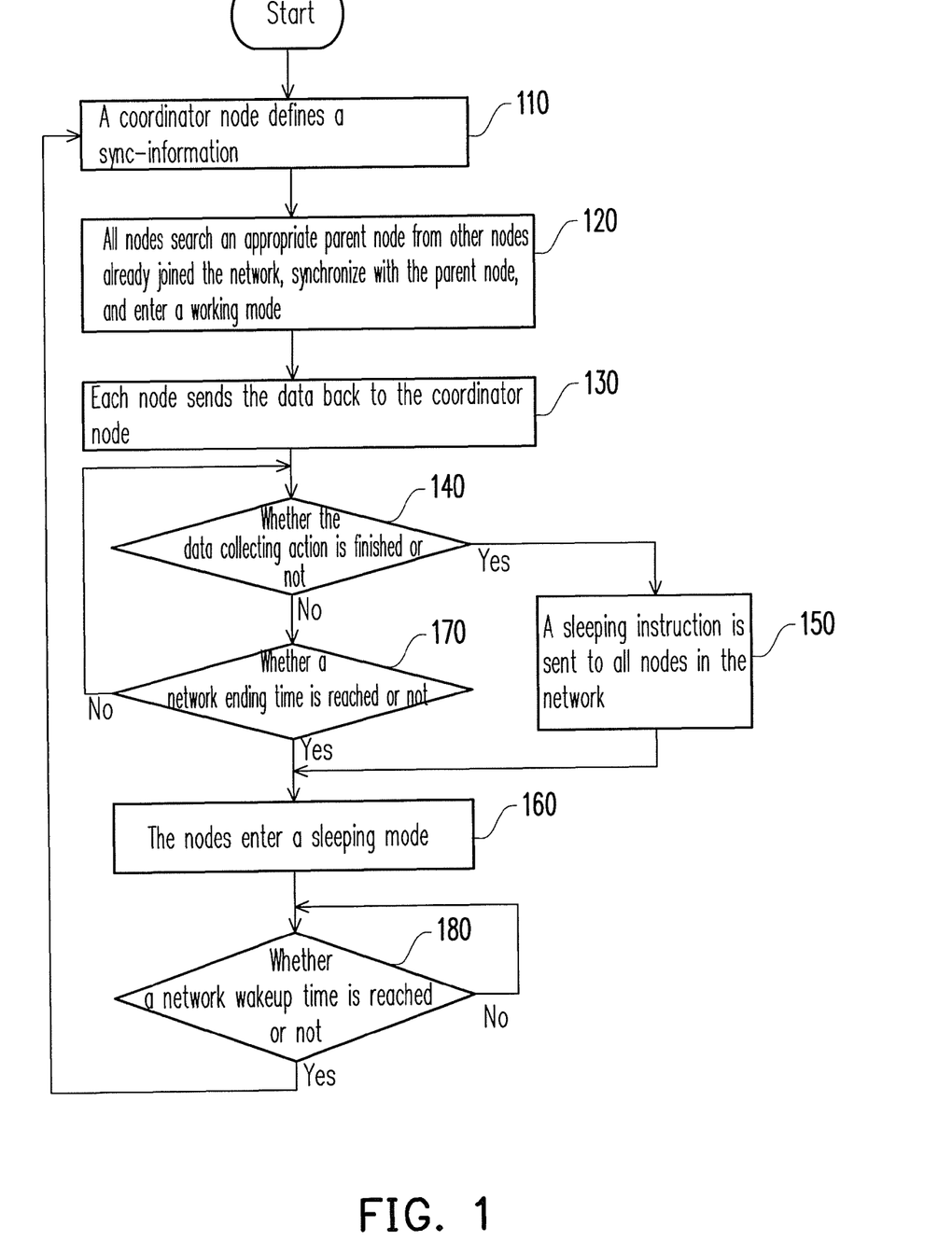
FIG. 1 is a flow chart of a method for network synchronization according to an embodiment of the present invention.

FIG. 1 is a flow chart of a method for network synchronization according to an embodiment of the present invention. In this embodiment, under a network architecture with the power supplied by, for example, a battery, detailed steps of synchronizing all nodes intending to join the network with an operating timing of the network are described. The network may be a wireless sensor network (WSN), and a most upstream of the network has a coordinator node capable of being connected to a computer system through Ethernet or an RS232 interface, thereby sending the integrated network data to the computer system. In this network architecture, the coordinator node is, for example, connected to a permanent power source, and batteries supply the power for other nodes in the network.

Referring to FIG. 1, in the method for network synchronization of this embodiment, the time of the coordinator node is used as a time reference of the whole network, therefore, as shown in Step 110, the coordinator node defines sync-information for the nodes. Further, the coordinator node firstly obtains a preset network working period and a preset synchronization cycle, and defines a network ending time and a network wakeup time of the next time according to a current time of the coordinator node, the network working period, and the synchronization cycle. The network working period refers to the longest time when the network may exist. The synchronization cycle (greater than the network working period) refers to the time when the network data must be collected. In other words, when the nodes already joined the network are in the network working period, the data collecting or sending action may be performed. However, after the network working period is end, the node may actively enter a sleeping mode until the synchronization cycle is end. In this embodiment, after the coordinator node defines the network ending time and the network wakeup time, the current time, the network ending time, and the network wakeup time are used as the sync-information and a reference for the nodes attempting to join the network later on. It should be noted that in this embodiment, the network working period and the synchronization cycle are preset parameters, and may be changed according to different network demands or accumulated experiences as desired, and the numerical scope thereof is not limited here.

Next, in Step 120, when each node intending to join the network attempts to join the network, an appropriate parent node (for example, a node with a stronger response signal) is searched from other nodes already joined the network per specific time interval, so as to build a network topology of a tree structure. The time interval relates to the state of the node. For example, the node attempting to join the network for the first time searches the parent node per longer time interval, and the node ever joined the network searches the parent node per shorter time interval. If the node finds the parent node successfully, it represents that the node may join the network and may receive the sync-information sent by the parent node. Accordingly, the node synchronizes the timer disposed therein with the parent node, and enters a working mode. In this embodiment, when the node already joined the network sends the sync-information to a downstream of the network (i.e. to child nodes), for example, the time of sending the sync-information is used as the current time in the sync-information. Therefore, after the node attempting to join the network finds the parent node and updates the timer according to the current time of the sync-information, the node may be synchronized with the parent node.

Once the node in the network enters the working mode, it represents that the data collecting and sending actions may be started. Therefore, as shown in Step 130, all nodes in the network send the data back to the coordinator node. If the node is a sensor node, after entering the working mode, the data may be obtained through a sensor on the node. When the node is a router node, as the main function of the router node is data forwarding, the data sent by the child node may be received. After obtaining the data, the node sends the data towards the upstream of the network. For example, it is assumed that a node B is a child node of a node A, it represents that when the node B joins the network, the node A is selected as the parent node. After obtaining the data, the node B sends the data back to the node A. The node A may send the data back to its parent node. As the constructed network topology is the tree structure when the node joins the network, each node in the network hierarchically sends the data back to the coordinator node through the parent node. It should be noted that after finishing constructing the network, the operation may be performed according to a former communication protocol. The lower layer of the network may avoid the collision through a carrier sense multiple access/collision avoidance (CSMA/CA) mechanism.

Next, in Step 140, the coordinator node determines whether the data collecting action is finished or not. If the coordinator node obtains the data sent back by each node in the network, as shown in Step 150, the coordinator node sends the sleeping instruction to all nodes using the coordinator node as the parent node. Here, when receiving the sleeping instruction sent by the parent node, the node sleeping instruction also sends the sleeping instruction downwards to the child node. Next, in Step 160, each node in the network hierarchically receives the sleeping instruction, so as to enter the sleeping mode.

The procedure returns to Step 140, if the coordinator node does not finish the data collecting action, as shown in Step 170, each node in the network uses the internal timer and the formerly received sync-information to determine whether the network ending time is reached or not. If the network ending time is not reached, the node maintains in the working mode capable of collecting and sending the data, and the flow of the method for network synchronization returns to the Step 140 again, the coordinator node determines whether the data collecting action is finished or not. However, when the timer in the node determines that the network ending time is reached, as shown in Step 160, the node stops obtaining or sending the data, and switches from the working mode to the sleeping mode.

When all nodes in the network enter the sleeping mode, that is, the network working period is terminated, the whole network is in the sleeping state in which the work is stopped. Next, as shown in Step 180, the timer in each node continues to count time, and repeatedly determine whether the network wakeup time is reached or not. When the network wakeup time is reached (that is, a new synchronization cycle is started), the steps of FIG. 1 are repeated, the node selects the appropriate parent node according to the current situation so as to join the network, such that the appropriate network topology is built and the whole network enters the network working period again.

It may be found from the steps of FIG. 1 that the nodes in the network hierarchically enter the working mode, and at the same time hierarchically switch from the working mode to the sleeping mode. More particularly, in the method for network synchronization of this embodiment, the coordinator node of the most upstream of the network defines the time reference of the whole network, and each node, when intending to join the network, must synchronize the time with the parent node. Next, the timer in the node counts the time, when the timer determines that the network ending time is reached according to the sync-information, the node automatically enters the sleeping mode, and when the timer determines that the network wakeup time is reached, the node attempts to join the network again. Accordingly, all nodes in the network may work and sleep at the same time. In the network working period (that is, the nodes enter the working mode), the data retrieving and transmission are finished, such that it is not necessary to additionally process the delay and the buffer of the data packets by reason of that some nodes are in the working mode while some nodes are in the sleeping mode. The data transmission manner of the lower layer of the network are not changed, thereby saving the total power consumption of the network and extending the lifetime of the battery of each node.

Figure 2:
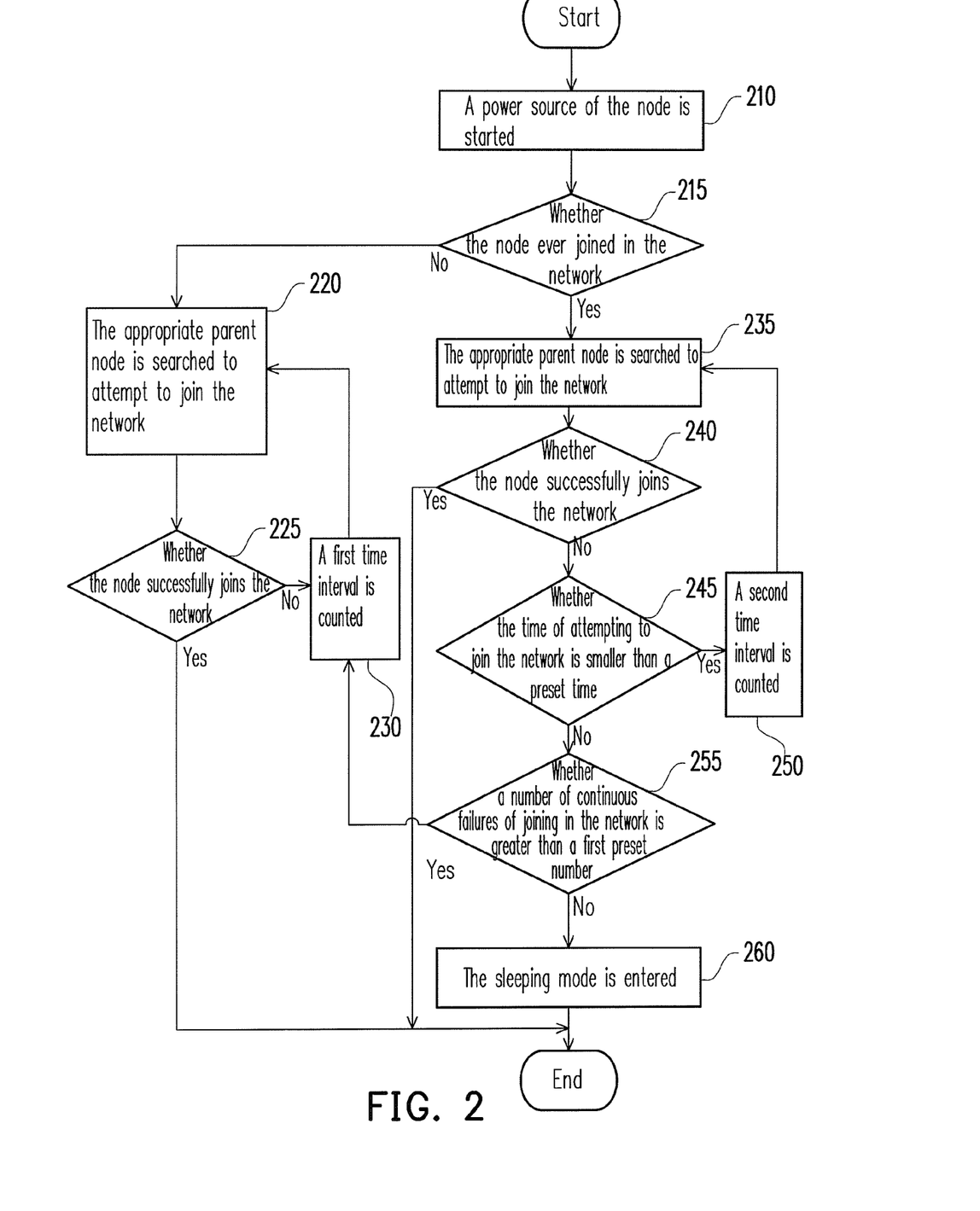
FIG. 2 is a flow chart of nodes attempting to join the network according to an embodiment of the present invention.

As long as the network is in the network working period, after the power source is started, the node may detect the parent node and join the network. In the embodiment as follows, a detailed flow of the nodes attempting to join the network under various situations is further described. FIG. 2 is a flow chart of nodes attempting to join the network according to an embodiment of the present invention. Referring to FIG. 2, firstly as shown in Step 210, the node with the started power source prepares to attempt to join the network. In this embodiment, the power source of the node is, for example, supplied by the battery.

Next, in Step 215, it is determined whether the state of the node is that the node ever joined the network or not. If the node never joins the network before, as shown in Step 220, firstly the appropriate node is searched from other nodes already joined the network as the parent node. Next, in Step 225, it is determined whether the node is successfully joined the network or not, that is, it is determined whether the node successfully finds the parent node or not. If yes, the flow of the node joining the network is end. However, if the node cannot find the parent node, as shown in Step 230, the timer in the node counts a first time interval, and then the procedure returns to the Step 220 to search the appropriate parent node, so as to attempt to join the network. In other words, after the power source is started, the node powered for the first time attempts to join the network per first time interval.

Next, the procedure returns to Step 215, if a determining result shows that the node ever joined the network, firstly as shown in Step 235, the appropriate node is searched from other nodes already joined the network as the parent node. Next, in Step 240, it is determined whether the node may successfully join the network or not. If the node successfully joins the network, the flow of the node attempting to join the network is end. If the node cannot find the parent node, in Step 245, it is determined whether a time of attempting to join the network by the node is smaller than a preset time or not. If the time is smaller than the preset time, in Step 250, the timer of the node counts the second time interval, and next the procedure returns to Step 235 to search the parent node again, thereby attempting to join the network. The second time interval is smaller than the first time interval, the first time interval is smaller than the network working period, and the preset time is a multiple of the network working period.

Next, the procedure returns to Step 245, if the time of attempting to join the network by the node is greater than or equal to the preset time, as shown in Step 255, it is determined whether a number of continuous failures of joining in the network by the node is greater than a first preset number or not. If the number of continuous failures of joining in the network is smaller than or equal to the first preset number, as shown in Step 260, the node enters the sleeping mode and ends the flow of attempting to join the network. Until the timer in the node determines that the network wakeup time is reached, the node executes the flow of attempting to join the network as shown in FIG. 2 again, and searches the parent node per second time interval to attempt to join the network. However, if the number of continuous failures of joining in the network by the node is greater than the first preset number, as shown in Step 230, after the timer counts the first time interval, in Step 220, the node searches the parent node to attempt to join the network. In other words, after the node attempts to join the network and the number of continuous failures is greater than the first preset number, the node is considered to be in the state of being not joined the network, and searches the parent node per first time interval to attempt to join the network.

Figure 3A:
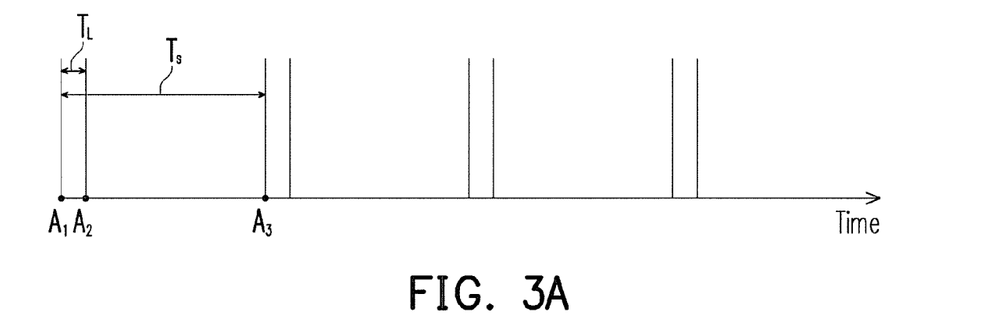
FIGS. 3A, 3B, 3C, and 3D are schematic situational views of an operating timing of the network according to an embodiment of the present invention.

In order to make the present invention more comprehensive, a further description is given according to various states of FIG. 2 in the embodiments as follows. FIG. 3A is a schematic situational views of the operating timing of the network according to an embodiment of the present invention. As shown in FIG. 3A, a period from a time point A1 to a time point A2 is a network working period $T_L$, and a period from the time point A1 to a time point A3 is a synchronization cycle $T_S$. The network working period $T_L$ and the synchronization cycle $T_S$ are preset values. During the period when the network is in the network working period $T_L$, all nodes in the network are in the working mode, and during the time except for the network working period $T_L$, the nodes are in the sleeping mode.

Figure 3B:
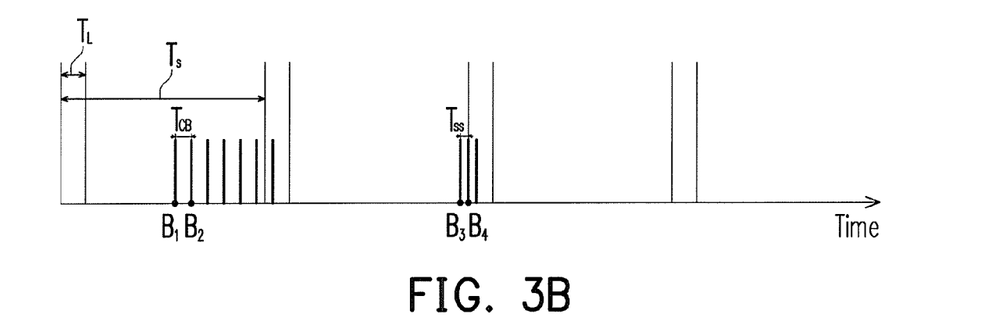

FIG. 3B is a schematic view of the nodes with different states attempting to join the network. Referring to FIG. 3B, it is assumed that the node not joining the network starts the power source at the time point B1 and attempts to join the network, before formally joining the network, the node attempts to join the network per first time interval $T_{CB}$, so as to search a time period overlapped with the network working period $T_L$. It is assumed that the node ever joined the network attempts to join the network at the time point B3, before joining the network, the node attempts to join the network per second time interval $T_{SS}$.

It may be clearly found from FIG. 3B that the node newly joined the network attempts to search the parent node per loose interval to join the network, but the node ever joined the network attempts to search the parent node more frequently. In this manner, the node not joining the network does not receive any sync-information, so the node does not know the time point when the network working period $T_L$ starts. Therefore, it is more power-saving to attempt to join the network per loose interval. However, the node ever joined the network is basically synchronizes with the operating timing of the network, such that the time point when the node switches from the sleeping mode to the working mode again should be quite adjacent to the time point when the network enters the network working period $T_L$. The timer in the node may generate some errors by reason of power or temperature, so in order to make the node join the network again more quickly, the node frequently searches the parent node per smaller time interval.

Figure 3C:
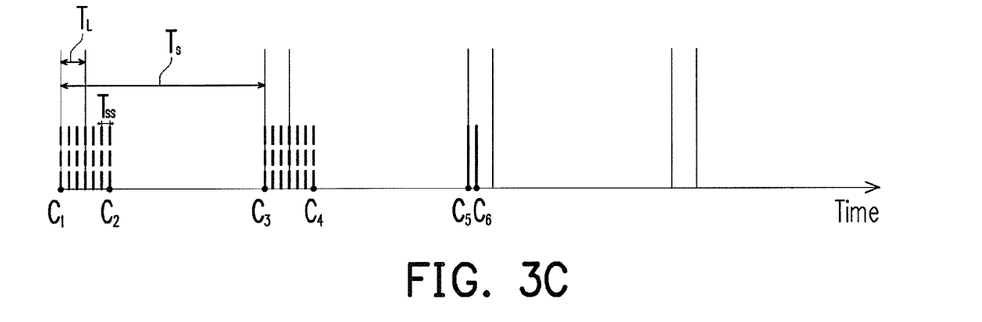

FIG. 3C is a schematic situational view of the operating timing of the networking according to another embodiment of the present invention. In this embodiment, it is assumed that the preset time of Step 245 of FIG. 2 is twice of the network working period $T_L$ (for example, from a time point C1 to a time point C2). If the node ever joined the network searches the parent node per second time interval $T_{SS}$ from the time point C1 to attempt to join the network, the signal is shield and the node cannot successfully find the parent node, the node determines whether the number of continuous failures of finding the parent node is greater than the first preset number or not, when the time of attempting to join the network reaches the preset time (i.e. the time point C2). If the number of failures does not exceed the first preset number, the node enters the sleeping mode (i.e. a period from the time point C2 to a time point C3). Until the timer determines that the network wakeup time (i.e. time point C3) is reached, the node attempts to join the network again. In this embodiment, although the node cannot successfully join the network by reason of the poor signal, the timer still continues to count the time, such that the node repeatedly enters the sleeping mode when the network ending time is reached, and attempts to join the network again when the network wakeup time is reached. In other words, although the node does not successfully join the network, it is still assumed that the node is synchronized with the environment, and sleeps at the appropriate time point to save the power consumption.

Figure 3D:
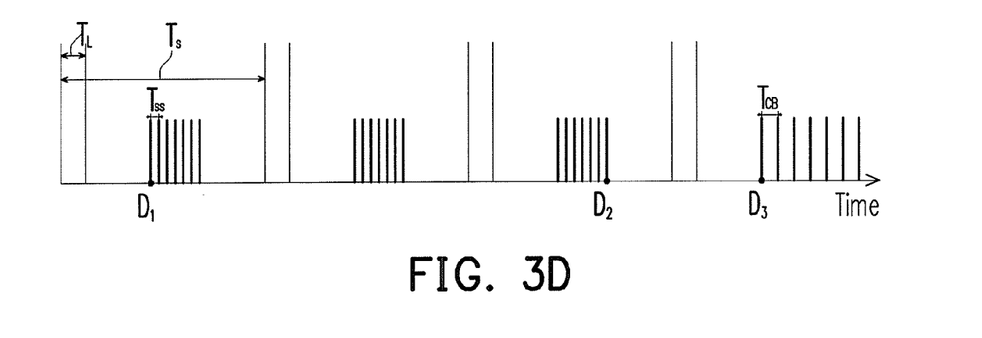

Referring to FIG. 3D, it is assumed that during a period from a time point D1 to a time point D2, a node ever joined the network continuously attempts to join the network per second time interval $T_{SS}$, but cannot find the parent node. When the node attempts to join the network at a time point D3, the number of continuous failures of joining in the network is greater than the first preset number, next, the node attempts to join the network again per first time interval $T_{CB}$. As a result, even the node, ever joined the network and not accurately entering the working mode again in the network working period by reason of problems during the operation process, may attempt to join the network again per loose time interval in a power-saving manner.

Figure 4:
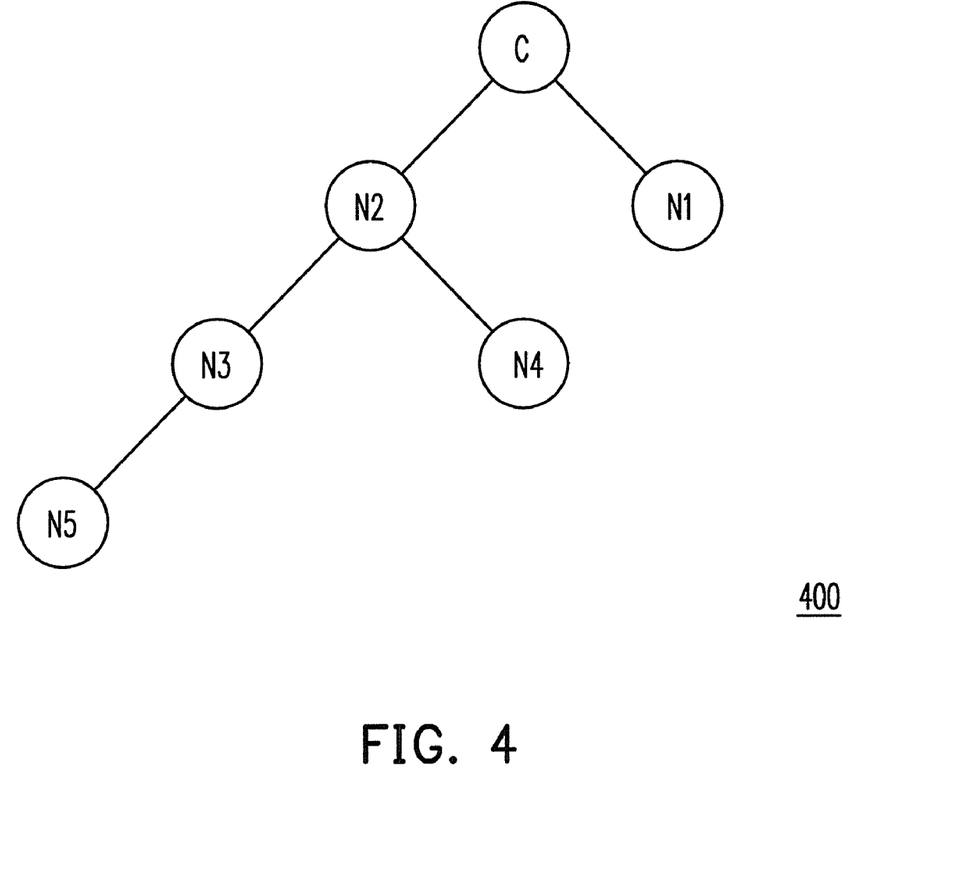
FIG. 4 is a schematic view of a network topology according to an embodiment of the present invention.

FIG. 4 is a schematic view of a network topology according to an embodiment of the present invention. Referring to FIG. 4, a network 400 is a tree structure network built after a router node N2, a router node N3, a sensor node N1, a sensor node N4, and a sensor node N5 join the network. After entering the working mode, the sensor node N1, the sensor node N4, and the sensor node N5 may obtain the data through the sensor disposed therein, and the router node N2 and the router node N3 perform the data forwarding action. In this embodiment, the coordinator node C obtains the information showing whether each node (i.e. the router node N2, the router node N3, the sensor node N1, the sensor node N4, and the sensor node N5) in the network 400 sends the data back in every network working period or not. When all nodes in the network 400 send the data back to the coordinator node C, the coordinator node C sends the sleeping instruction to the child nodes (i.e. the sensor node N1 and the router node N2), so as to make the child nodes enter the sleeping mode. Before entering the sleeping mode, the router node N2 sends the sleeping instruction downwards to the two child nodes, namely, the router node N3 and the sensor node N4, and the rest may be deduced by analogy. After receiving the sleeping instruction, all router nodes in the network 400 send the sleeping instruction downwards, and enter the sleeping mode. However, it is assumed that the router node N3 cannot receive the sleeping instruction sent by the router node N2 by reason of the poor signal, the router node N3 automatically enters the sleeping mode when the network ending time is reached, according to the operation of the built-in timer.

In an embodiment, it is assumed that after sending the data back, all sensor nodes enter the sleeping mode. After the coordinator node C collects all data, as long as the coordinator node C hierarchically sends the sleeping instruction downwards, all router nodes in the network 400 enter the sleeping mode in advance without waiting for the ending of the network working period, thereby further saving the power consumption.

In another embodiment, if the node (for example, the sensor node N4) not sending the data back to the coordinator node C exists in the network 400, the coordinator node C may not send the sleeping instruction downwards, and all nodes enter the sleeping mode after the timer determines that the network ending time is reached. However, if the number of continuous failures of obtaining the data sent back by the sensor node N4 by the coordinator node C reaches the second preset number (for example, 20 times), the coordinator node C omits the sensor node N4, sends the sleeping instruction downwards to the child nodes, and further commands other nodes in the network 400 to enter the sleeping mode in advance.

Figure 5:
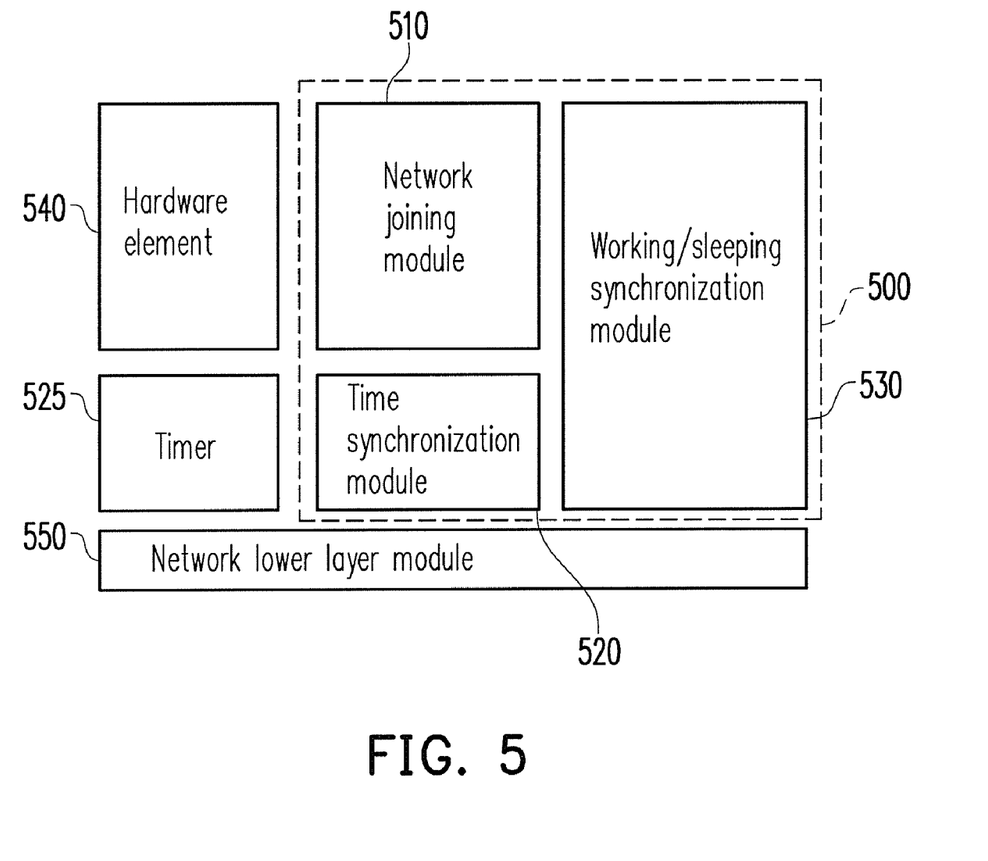
FIG. 5 is a schematic view of a system for network synchronization and a node architecture according to an embodiment of the present invention.

FIG. 5 is a schematic view of a system for network synchronization and a node architecture according to an embodiment of the present invention. Referring to FIG. 5, a system for network synchronization 500 includes a network joining module 510, a time synchronization module 520, and a working/sleeping synchronization module 530. Through the operation of the system for network synchronization 500, under a situation of not adding any hardware, the data sending action and the sleeping may be performed at the same time by using a timer 525 of the node and a hardware element 540 and through a former network lower layer module 550, thereby saving the power.

When the node attempts to join the network, the network joining module 510 searches an appropriate parent node from other nodes already joined the network per specific time interval, according to whether the node is in the state of attempting to join the network for the first time or not. By dynamically searching the appropriate parent node, the network joining module 510 makes the node join the network, therefore the generated network topology reflects the environment of the network at that time on real time.

When the node finds the parent node, the time synchronization module 520 receives the sync-information sent by the parent node, and synchronizes the timer 525 in the node with the parent node. In other words, the time synchronization module 520 simulates the real time counting action according to the sync-information and the timer 525, and simulates a time axis of the whole network according to the received sync-information.

The working/sleeping synchronization module 53 enables the node enter a working mode after the node finds the parent node, enables the node switch from the working mode to the sleeping mode when receiving the sleeping instruction sent by the parent node or determining that the network ending time is reached according to the sync-information. When determining that the network wakeup time is reached according to the sync-information, the working/sleeping synchronization module 530 controls the network joining module 510 to attempt to join the network again.

It should be noted that after the node is in the working mode, the working/sleeping synchronization module 530 sends the sync-information to its child nodes, and sends the obtained data to its parent node. When receiving the sleeping instruction sent by the parent node, the working/sleeping synchronization module 530 sends the sleeping instruction downwards to the child nodes. The detailed operating flow of the network joining module 510, the time synchronization module 520, and the working/sleeping synchronization module 530 is the same as or similar to that of the above embodiment, so it is not described here.

In another embodiment, the time synchronization module built in the coordinator node obtains the preset network working period and the preset synchronization cycle, and defines the network ending time and the network wakeup time of the next time, according to the current time of the coordinator node, the network working period, and the synchronization cycle. The working/sleeping synchronization module built in the coordinator node sends the sleeping instruction to all nodes using the coordinator node as the parent node, when it is determined that all data of the network is collected, and directly sends the sleeping instruction to all nodes using the coordinator node as the parent node, when it is determined that the number of continuous failures of obtaining the data obtained by a certain node reaches the second preset number. That is to say, through the operation of the modules, the coordinator node defines the sync-information of the network for serving as the time synchronization reference for all nodes intending to join the network, and enables the nodes in the network enter the sleeping mode in the manner of sending the sleeping instruction at an appropriate time.

To sum up, in method and the system for network synchronization of the present invention, the coordinator node plans the sleeping and the working time cycle of the network, the sync-information is sent when each node attempts to join the network, so as to synchronize the node with the parent node, such that the node knows the time of entering the sleeping mode and the working mode of the next time. In the method and the system for network synchronization, by counting time with the timer in the node, all nodes in the network work and sleep at the same time without using any additional hardware, thereby achieving the purpose of extending the lifetime of the battery. In addition, during practical implementation of the method and the system, it is only necessary to perform development on an application support layer, so as to obtain the time information provided by the timer. In the present invention, it is not necessary to change the software of the lower layer of the network, and the special support of the software of the lower layer is not required, thereby having an extremely high flexibility, and being quickly applied to other platforms.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for network synchronization, for synchronizing a node with an operating timing of a network, wherein a root of the network is a coordinator node, for defining sync-information, the method comprising:
   a. searching a parent node from other nodes already joined the network per time interval, when the node attempts to join the network, wherein the time interval corresponds to a first time interval if it is a first time the node attempts to join the network, and the time interval corresponds to a second time interval if the node had joined the network before, in which the second time interval is smaller than the first time interval;
   b. receiving the sync-information sent by the parent node if the parent node is found, so as to synchronize a timer in the node with the parent node, and entering a working mode;
   c. switching from the working mode to a sleeping mode, when a sleeping instruction sent by the parent node is received, or the timer determines that a network ending time is reached according to the sync-information, wherein the network ending time is when a network working period of the network is ended; and
   d. returning to Step a. to attempt to join the network again, when the timer determines that a network wakeup time is reached according to the sync-information, wherein the network wakeup time is when the next network working period of the network is started.

2. The method for network synchronization according to claim 1, wherein if it is the first time the node attempts to join the network, Step a. further comprises:
   a1. searching the parent node from other nodes already joined the network; and
   a2. returning to Step a1. to attempt to search the parent node again per first time interval, if the parent node is not found.

3. The method for network synchronization according to claim 2, wherein if the node had joined the network before, Step a. further comprises:
   a3. searching the parent node from other nodes already joined the network;

a4. determining whether a time of attempting to join the network by the node is smaller than a preset time or not, if the parent node is not found; and a5. returning to Step a3. to attempt to search the parent node again per second time interval, if the time is smaller than the preset time.

4. The method for network synchronization according to claim 3, wherein after Step a4., Step a. further comprises:

a6. determining whether a number of continuous failures of finding the parent node by the node is greater than a first preset number or not, if the time of attempting to join the network by the node is greater than or equal to the preset time;

a7. returning to Step a1. to attempt to search the parent node again per first time interval, if the number is greater than the first preset number; and a8. entering the sleeping mode until the timer determines that the network wakeup time is reached, and returning to Step a3. to attempt to search the parent node again, if the number is smaller than or equal to the first preset number.

5. The method for network synchronization according to claim 3, wherein the preset time is a multiple of the network working period, the network working period is a maximum value of a time being in the working mode of all nodes already joined the network, and the network working period is greater than the first time interval.

6. The method for network synchronization according to claim 5, further comprising:

obtaining the preset network working period and a preset synchronization cycle by the coordinator node, wherein the network working period is smaller than the synchronization cycle; and defining the network ending time and the network wakeup time of the next time, according to a current time of the coordinator node, the network working period, and the synchronization cycle.

7. The method for network synchronization according to claim 1, wherein the sync-information comprises a current time, the network ending time, and the network wakeup time.

8. The method for network synchronization according to claim 7, wherein when the parent node sends the sync-information to the node, the method further comprises:

using a time of sending the sync-information as the current time.

9. The method for network synchronization according to claim 7, wherein Step b. further comprises:

updating the timer by the node according to the current time in the sync-information.

10. The method for network synchronization according to claim 1, wherein Step b. further comprises:

obtaining a data and sending the data to the parent node.

11. The method for network synchronization according to claim 10, wherein when the node is a sensor node, the step of obtaining the data comprises:

obtaining the data through a sensor.

12. The method for network synchronization according to claim 10, wherein when the node is a router node, the step of obtaining the data comprises:

receiving the data sent by a child node, wherein the node is selected as the parent node by the child node when the child node joins the network.

13. The method for network synchronization according to claim 12, wherein Step c. further comprises:

sending the sleeping instruction to the child node, when the node receives the sleeping instruction sent by the parent node.

14. The method for network synchronization according to claim 10, further comprising:

sending the sleeping instruction to all nodes using the coordinator node as the parent node, when the coordinator node determines that all data of the network is collected.

15. The method for network synchronization according to claim 14, further comprising:

sending the sleeping instruction to all nodes using the coordinator node as the parent node, when the coordinator node determines that a number of continuous failures of obtaining the data obtained by the node reaches a second preset number.

16. The method for network synchronization according to claim 1, wherein the network comprises a wireless sensor network (WSN).

17. A system for network synchronization, comprising:

a network joining module searching a parent node from other nodes already joined the network per time interval when a node attempts to join a network, wherein the time interval corresponds to a first time interval if it is a first time the node attempts to join the network, and the time interval corresponds to a second time interval if the node had joined the network before, in which the second time interval is smaller than the first time interval;

a time synchronization module, coupled to the network joining module, for receiving sync-information sent by the parent node when the node finds the parent node, so as to synchronize a timer in the node with the parent node; and a working/sleeping synchronization module, coupled to the network joining module and the time synchronization module, for enabling the node enter a working mode after the node finds the parent node, or enabling the node switch from the working mode to a sleeping mode when receiving a sleeping instruction sent by the parent node or determining that a network ending time is reached according to the sync-information, wherein when determining that a network wakeup time is reached according to the sync-information, the working/sleeping synchronization module controls the network joining module to attempt to join the network again, in which the network ending time is when a network working period of the network is ended and the network wakeup time is when the next network working period of the network is started.

18. The system for network synchronization according to claim 17, wherein if it is the first time the node attempts to join the network, the network joining module searches the parent node from other nodes already joined the network, and attempts to search the parent node again per first time interval when not finding the parent node.

19. The system for network synchronization according to claim 18, wherein if the node had joined the network before, the network joining module searches the parent node from other nodes already joined the network, and determines whether a time of attempting to join the network by the node is smaller than a preset time or not, when not finding the parent node, if the time is smaller than the preset time, the network joining module attempts to search the parent node again per second time interval.

20. The system for network synchronization according to claim 19, wherein when the time of attempting to join the network by the node is greater than or equal to the preset time, the network joining module determines whether a number of continuous failures of finding the parent node by the node is greater than a first preset number or not, if the number is greater than the first preset number, the network joining module attempts to search the parent node again per first time interval, if the number is smaller than or equal to the first preset number, the working/sleeping synchronization module enables the node enter the sleeping mode until the network wakeup time is reached, and then controls the network joining module to attempt to search the parent node again per second time interval.

21. The system for network synchronization according to claim 19, wherein the preset time is a multiple of the network working period, the network working period is a maximum value of a time being in the working mode of all nodes already joined the network, and the network working period is greater than the first time interval.

22. The system for network synchronization according to claim 21, wherein when being a coordinator node, the time synchronization module obtains the preset network working period and a preset synchronization cycle, and defines the network ending time and the network wakeup time of the next time, according to a current time of the coordinator node, the network working period, and the synchronization cycle, wherein the network working period is smaller than the synchronization cycle.

23. The system for network synchronization according to claim 17, wherein the sync-information comprises a current time, the network ending time, and the network wakeup time.

24. The system for network synchronization according to claim 23, wherein when the working/sleeping synchronization module sends the sync-information, a time of sending the sync-information is used as the current time.

25. The system for network synchronization according to claim 23, wherein the time synchronization module updates the timer according to the current time in the sync-information.

26. The system for network synchronization according to claim 17, wherein after the node enters the working mode, the working/sleeping synchronization module obtains a data and sends the data to the parent node.

27. The system for network synchronization according to claim 26, wherein when the node is a sensor node, the data is obtained through a sensor.

28. The system for network synchronization according to claim 26, wherein when the node is a router node, the data sent by a child node is received, and the node is selected as the parent node by the child node when the child node joins the network.

29. The system for network synchronization according to claim 28, wherein when receiving the sleeping instruction sent by the parent node, the working/sleeping synchronization module sends the sleeping instruction to the child node.

30. The system for network synchronization according to claim 26, wherein when being a coordinator node, the working/sleeping synchronization module sends the sleeping instruction to all nodes using the coordinator node as the parent node when determining that all data of the network is collected.

31. The system for network synchronization according to claim 30, wherein when determining that a number of continuous failures of obtaining the data obtained by the node reaches a second preset number, the working/sleeping synchronization module sends the sleeping instruction to all nodes using the coordinator node as the parent node.

32. The system for network synchronization according to claim 17, wherein the network comprises a wireless sensor network (WSN).

\* \* \* \* \*